US006553887B1

(12) United States Patent
Bureaux et al.

(10) Patent No.: US 6,553,887 B1
(45) Date of Patent: Apr. 29, 2003

(54) FOAM FORMULATIONS

(75) Inventors: John G. Bureaux, Orleans (CA); George Cowan, Burnstown (CA); Edward N. Cundasamy, Orleans (CA); J. Garfield Purdon, S.E. Medicine Hat (CA)

(73) Assignee: Her Majesty the Queen in right of Canada as represented by the Solicitor General Acting through the Commissioner of the Royal Canadian Mounted Police, Ottawa (CA)

( * ) Notice: Subject to any disclaimer, the term of this patent is extended or adjusted under 35 U.S.C. 154(b) by 0 days.

(21) Appl. No.: 09/507,081

(22) Filed: Feb. 18, 2000

Related U.S. Application Data

(60) Provisional application No. 60/120,874, filed on Feb. 19, 1999.

(51) Int. Cl.[7] .......................... A62D 3/00; B01F 17/08; B01F 17/10; F42B 33/00
(52) U.S. Cl. ................. 86/50; 516/10; 516/14; 516/17; 588/202; 588/901
(58) Field of Search ............................. 516/10, 14, 17; 510/497; 588/901, 202; 86/50

(56) References Cited

U.S. PATENT DOCUMENTS

| | | | | |
|---|---|---|---|---|
| 3,919,101 A | * | 11/1975 | Anstett et al. | 516/14 X |
| 4,442,018 A | * | 4/1984 | Rand | 516/14 |
| 4,770,794 A | * | 9/1988 | Cundasawmy et al. | 516/14 X |
| 4,795,590 A | * | 1/1989 | Kent et al. | 516/14 X |
| 4,849,117 A | * | 7/1989 | Bronner et al. | 516/14 X |
| 5,716,925 A | * | 2/1998 | Mondin et al. | 510/497 X |

FOREIGN PATENT DOCUMENTS

| | | | | |
|---|---|---|---|---|
| EP | 0 314 903 | 5/1989 | | C08G/77/46 |
| EP | 0 532 179 | 3/1993 | | C08B/47/14 |
| WO | WO 96 11249 | 4/1996 | | C11D/1/75 |

* cited by examiner

*Primary Examiner*—Richard D. Lovering
(74) *Attorney, Agent, or Firm*—J. Wayne Anderson

(57) ABSTRACT

The invention disclosed relates to a foam-forming composition, for suppression/containment of blast from explosive devices. The composition comprises, a) a surfactant 40–80% w/w
b) a foam stabilizer 0–7% w/w
c) a polyalkylene glycol 10–30% w/w
d) water, balance to 100%.

19 Claims, 14 Drawing Sheets

% Coupling Agent In Dilute Solution

Trials mg/m3 MS vs Minutes (0, 5, 10, 15, 20, 25, 30)

Legend:
- Lethal Level Sarin 1 min. Exposure
- Test 1
- Test 2
- Test 3

FIG. 7

- Range Baseline Device 2
- Lethal Level Sarin 1 min. Exposure
- Test Device 2 ( all readings <1mg/m3>

- Chamber Baseline Device 1
- Test Device 1

FIG. 12

Range DAMMS Tube Sampler Setup

FOAM FORMULATIONS

CROSS-REFERENCE TO RELATED APPLICATION

This application is a Continuation-in-Part of U.S. Application Serial No. 60/120,874, filed Feb. 19, 1999.

FIELD OF THE INVENTION

This invention relates to foam formulations having blast-suppressant/containment capabilities.

BACKGROUND OF THE INVENTION

Improvised explosive devices(IEDs) represent an increasingly dangerous threat to society, particularly when they contain a toxic chemical/biological (CB) agent. It is vital that both the blast effects pressure wave, heat and shrapnel) and the CB agent-containing aerosols resulting from the initiation of such devices are contained. CB agents also present a decontamination problem when deposited on the surfaces of various equipment and vehicles, or spilled on the ground.

In the last decade, there have been numerous patents and papers on the use of foam for blast suppression. For example, Clark described in his U.S. Pat. Nos. 4,541,947 and 4,589,341, an improved method for blast suppression through the use of fire fighting foams confined in a tubular barrier. Typically, the foams have an expansion 50:1–1000:1 and there is no mention as to its composition. The key to this invention is the methodology for containing the foam in a desired location.

U.S. Pat. No. 4,964,329 assigned to Broken Hill Ltd. describes a composition consisting of a mixture of foamable liquid and a particulate additive to be supported as a dispersion in the foam. The dispersion is claimed to be effective in sound attenuation and shock wave dispersion.

U.S. Pat. No. 4,442,018 of P. Rand describes a foaming composition useful for blast suppression: Such composition comprises a combination of water soluble polymer of the polyacrylic acid type, a foam stabilizer of dodecyl alcohol, a surfactant, a solvent.

A very interesting U.S. Pat. No. 5,434,192 describes a composition of surfactants and stabilizers consisting of a mixture of modified natural and synthetic polymer and solvents capable of producing foam viable for 12 hours to several stays at 75–105 degrees F. Such foam is used to suppress the emission of volatile gases and vapours.

A number of containment options are available. Initially, we conducted blast tests with a foam product called AFFF contained in nylon dome tents that were disposed over the threat. The results were very inconsistent; the foam would break down very quickly, it varied from a watery form to very light and airy. The lessons learned during this phase included the realization that the physical form of the foam could be varied considerably by flow rate, percentage of surfactant and nozzle adjustment. This work led to the development of the containment system is described in Applicant's co-pending U.S. application Serial No. 60/069,533, filed. Dec. 12, 1997. That system includes a tent-like enclosure that is disposed over an TED and filled with an air-aspirated aqueous foam material which we have called Dispersal Suppressant Foam(DSF). The IED is then detonated, and the resulting shrapnel is contained within the enclosure. At that time, the foam material we used was a product sold under the trademark of SILVEX. Its formulation is covered by U.S. Pat. No. 4,770,794, which issued on Sep. 13 1988.

SUMMARY OF THE INVENTION

According to one aspect of the invention, a foam-forming composition having blast suppressant capability is provided, comprising (a) a surfactant 40–80%/w; (b) a foam stabilizer 0–7%/w; (c) a polyalkyleneglycol 10–30%/w; and (d) water balance to 100%.

In one embodiment of the invention, the polyalkylene glycol has the chemical formula $R_1$—$(OCH(CH_3)CH_2)_n$—$OR_2$, where $R_1$ and $R_2$ are independently H, an alkyl, or an ester group and n>1. The alkyl group may consist of a methyl, ethyl, propyl, butyl or a mixture thereof. In one example, $R_1$ or $R_2$ is hydrogen. In another example, both $R_1$ and $R_2$ are hydrogens.

Alternatively, the polypropylene glycol is a partially etherified polypropylene glycol derivative having the same formula $R_1$—$(OCH(CH_3)CH_2)_n$—$OR_2$, but where only one of $R_1$ or $R_2$ is independently H, or an alkyl group and n>1. Again the alkyl group representing $R_1$ or $R_2$ may be a methyl, ethyl, propyl, butyl group or a mixture thereof.

In one embodiment, the surfactant comprises a composition of either the formula $[R(OCH2CH_2[O])nX]_aM_b$, where R is an alkyl group having from eight to eighteen carbon atoms[,]; n is an integer from 1 to 10; X is selected from the group of $SO_3^{2-}$, $SO_4^{2-}$, $CO_3^{2-}$ and $PO_4^{3-}$[:]; M is an alkali metal, alkaline earth metal ammonium or amine derivative; a is the valence of M and b is the valence of $[R(OCH_2CH_2)_nX]$, or[,] the formula $[R$—$CH$=$CH(CH_2)_m$-$X]_aM_{b2}$ where R is an alkyl group having from eight to eighteen carbon atoms; m is an integer from 0 to 3; X is selected from the group of $SO_3^{2-}$, $SO_4^{2-}$, $CO_3^{2-}$ and $PO_4^{3-}$[,]; M is an alkali metal, alkaline earth metal, ammonium or amine derivative; a is the valence of M and b is the valence of $[R$—$CH$=$CH(CH_2)_m$-$X]_a$ or a mixture thereof.

BRIEF DESCRIPTIONS OF THE DRAWINGS

FIG. 7 illustrates the concentration gradient that was measured in the test chamber over a thirty minute duration—NOTE: These are the same shots as in FIG. 6, Baseline shots not shown as the scale was too large. This is still within acceptable limits but has prompted an effort to snake further improvements to the foam mitigating capacity;

Figure 1:
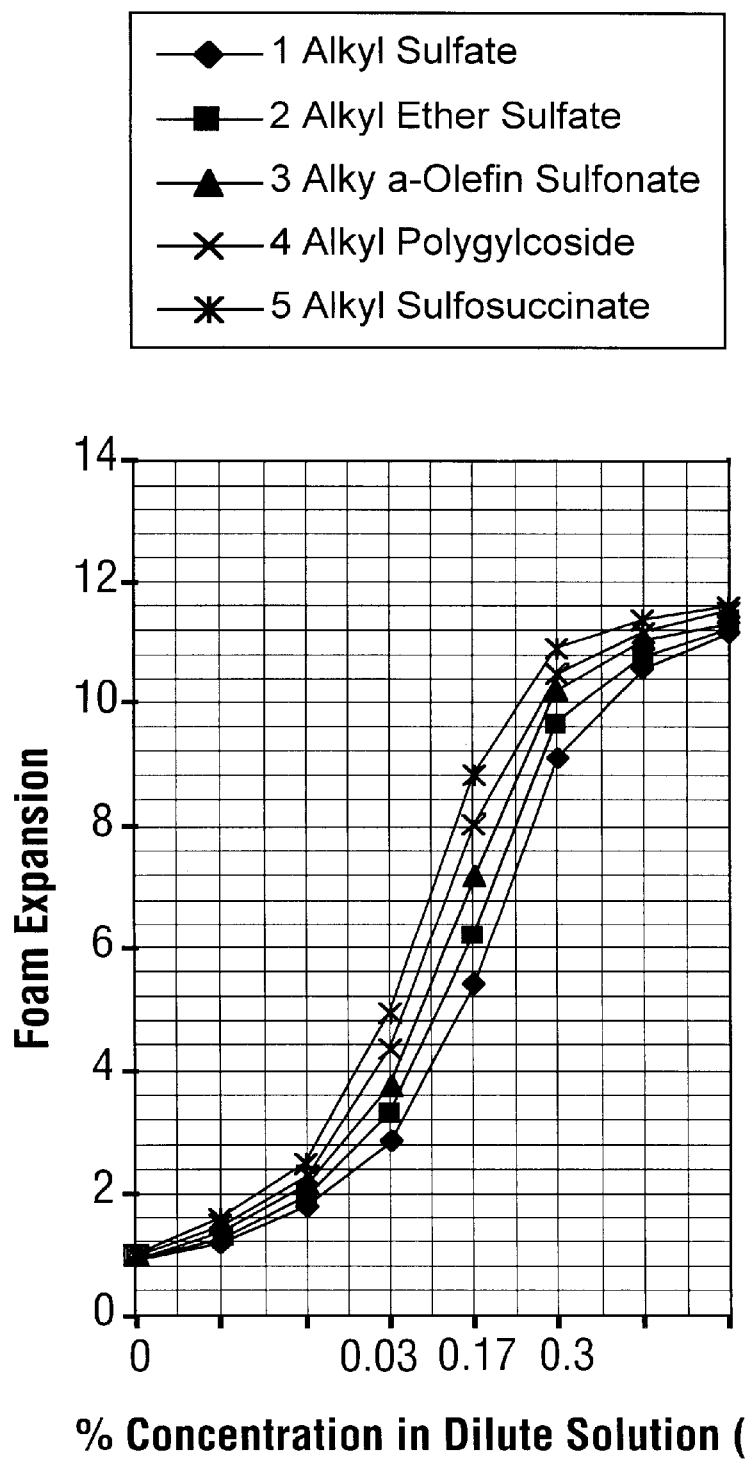
FIG. 1 is a graph illustrating foaming ability as a function, of surfactant concentration.
Figure 2:
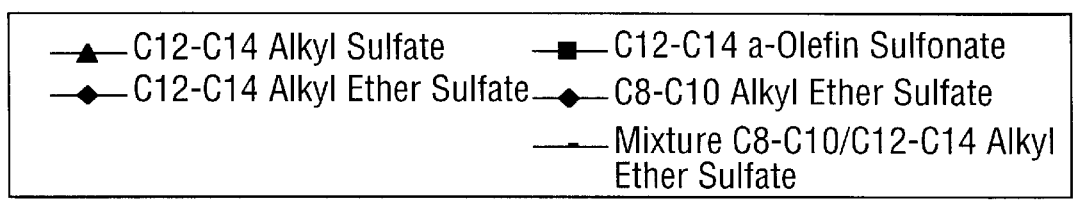
FIG. 2 is a graph illustrating foam stability for selected surfactants and surfactant mixture.
Figure 2:
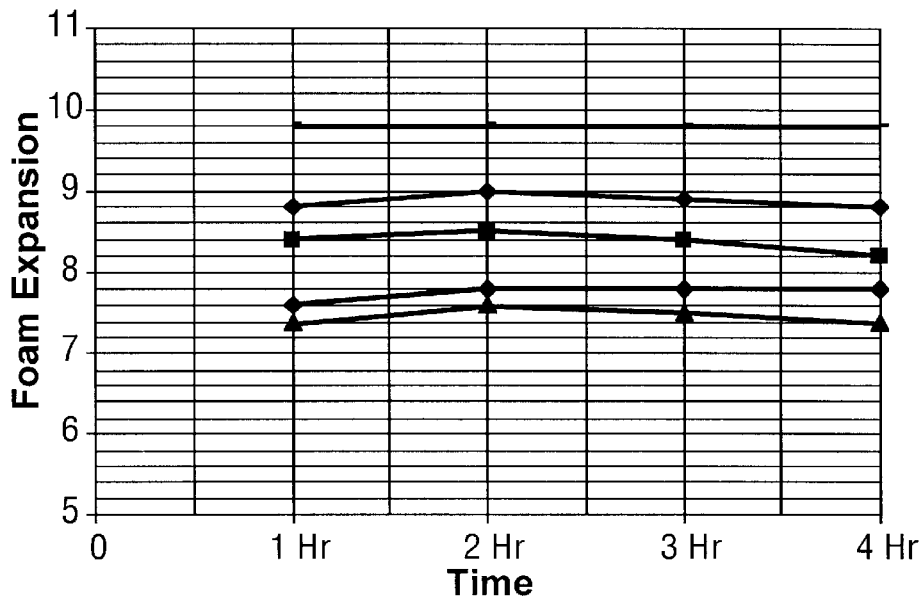
Figure 3:
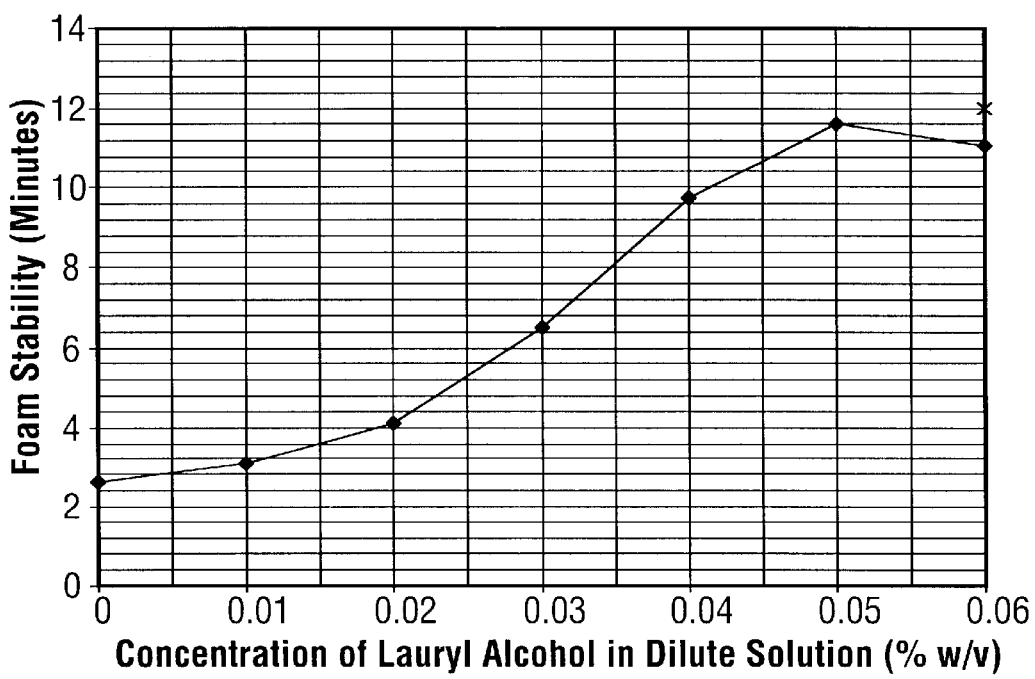
FIG. 3 is a graph illustrating foam stability as a function of lauryl alcohol concentration in the solution.
Figure 4:
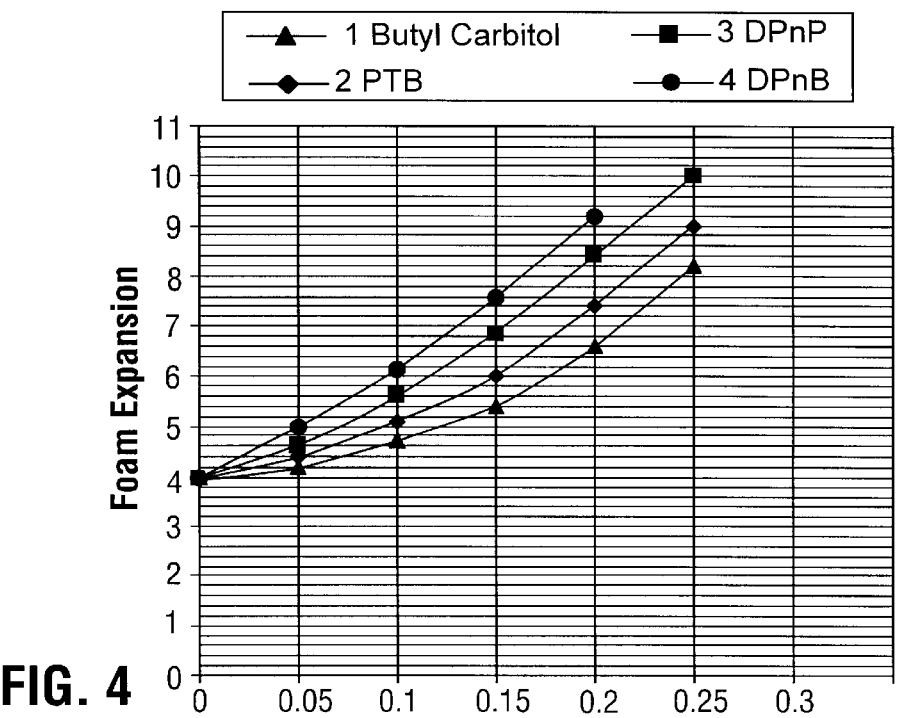
FIG. 4 is a graph illustrating foamability as a function of coupling agent percentage in the solution.
Figure 5:
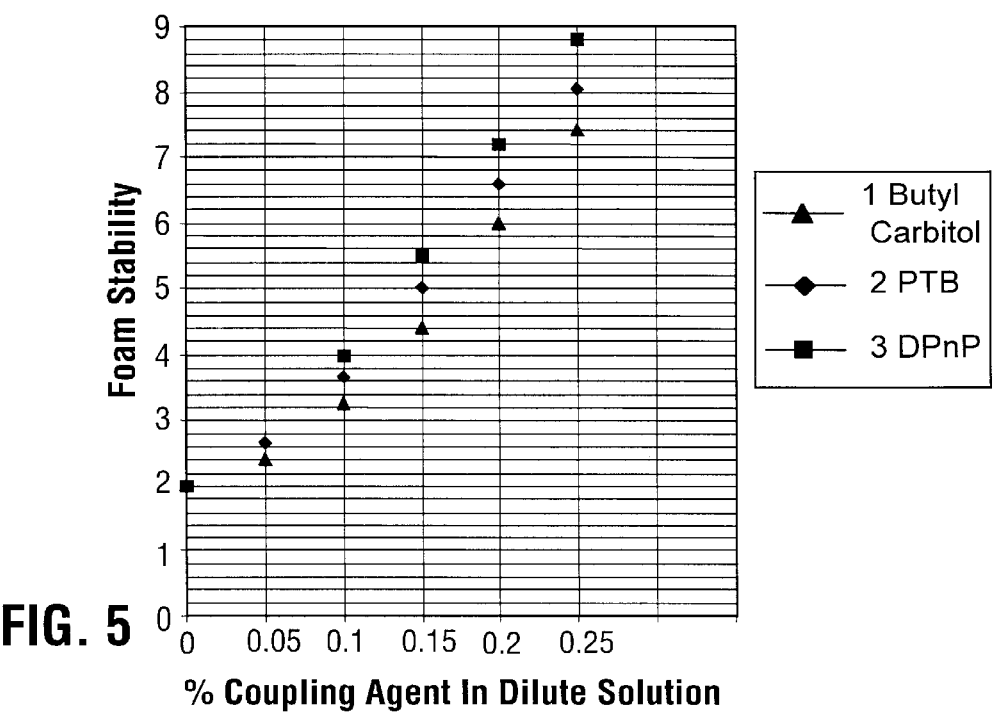
FIG. 5 is a graph illustrating foam stability as a function of coupling agent percentage in the solution.
Figure 6:
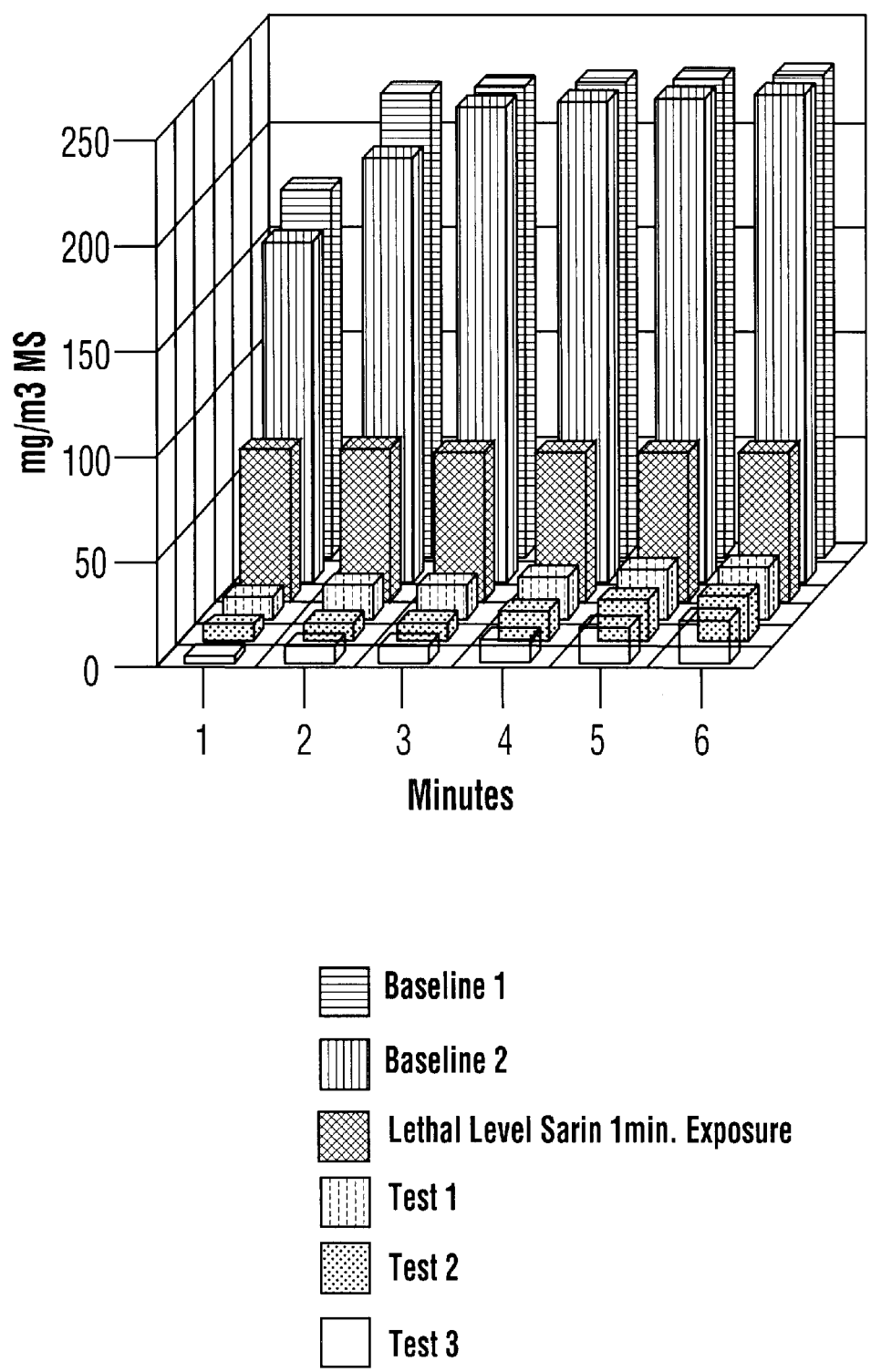
FIG. 6 illustrates the concentration values of methyl salicylate (mustard simulant) in the test chambers after two baseline shots (no enclosure) and three test device shots (enclosure with foam+placement of a tent over the device followed by the injection of DSF). The percentage of agent capture and containment exceeded 90%.
Figure 8:
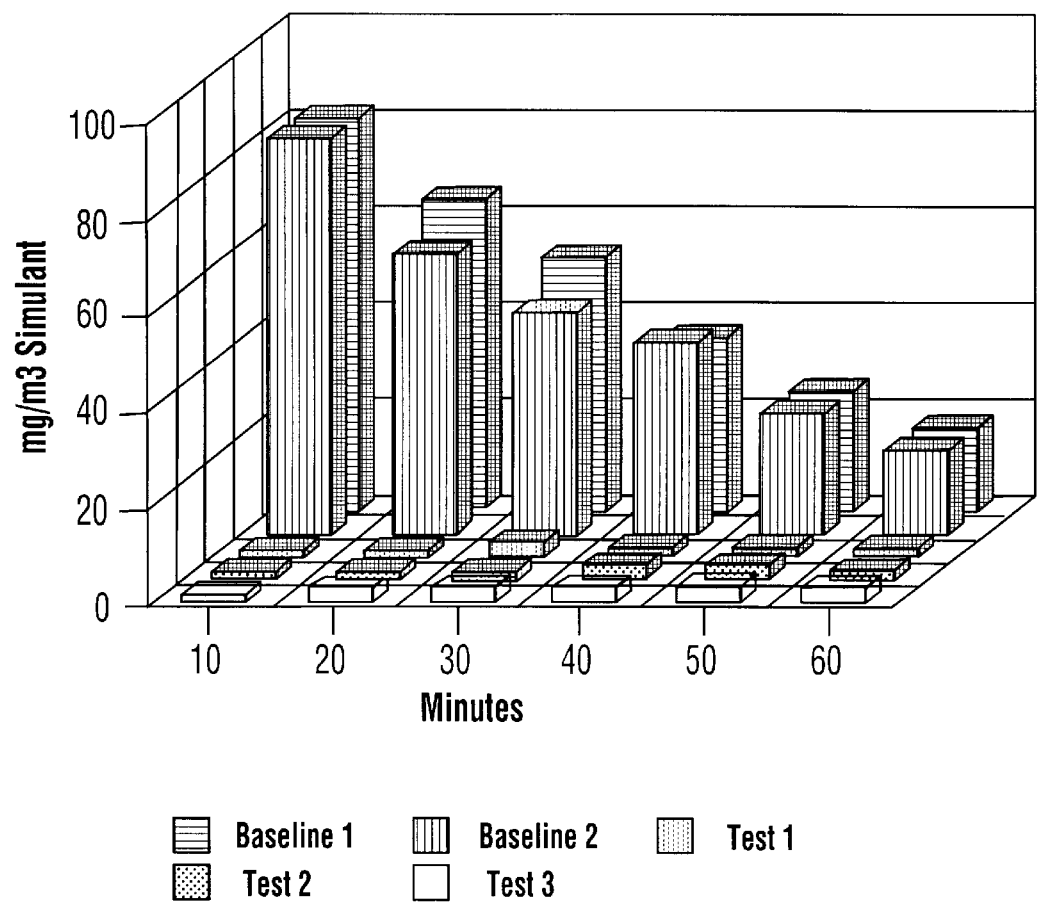
Figure 9:
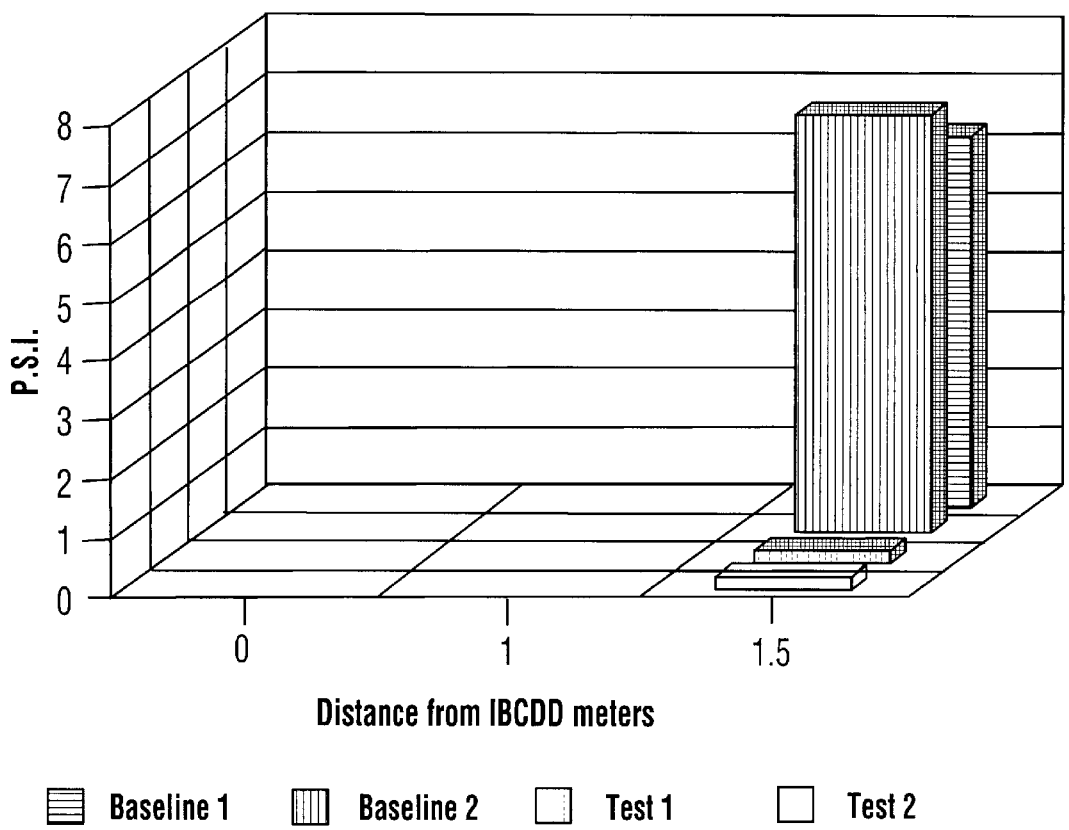
Figure 10:
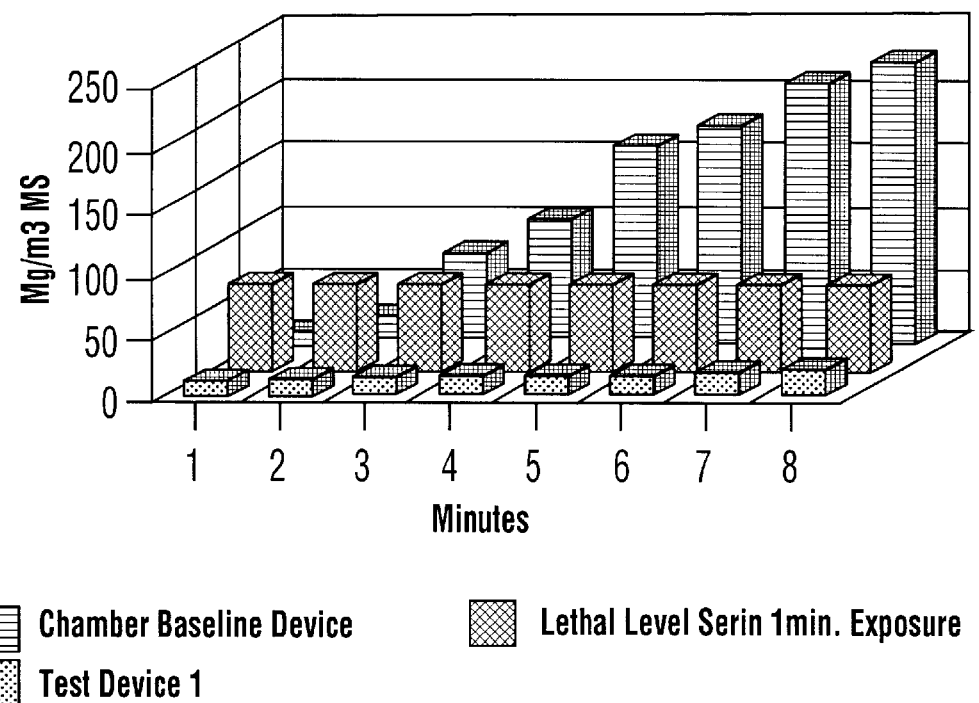
Figure 11:
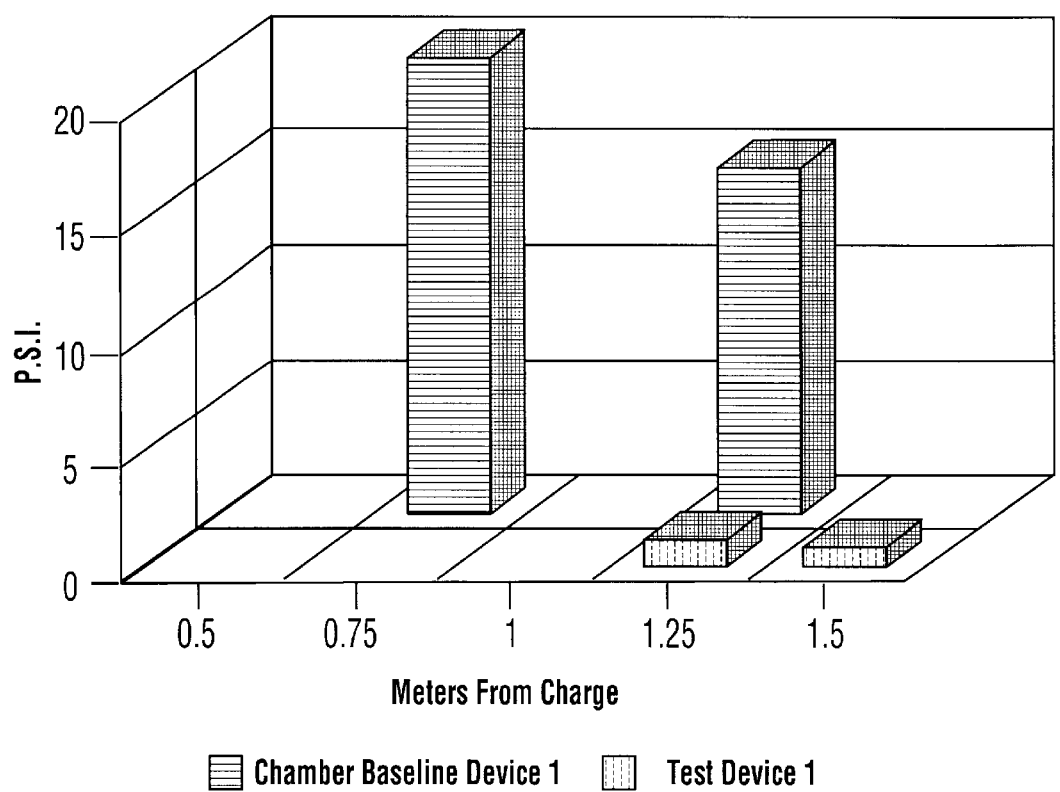
Figure 13:
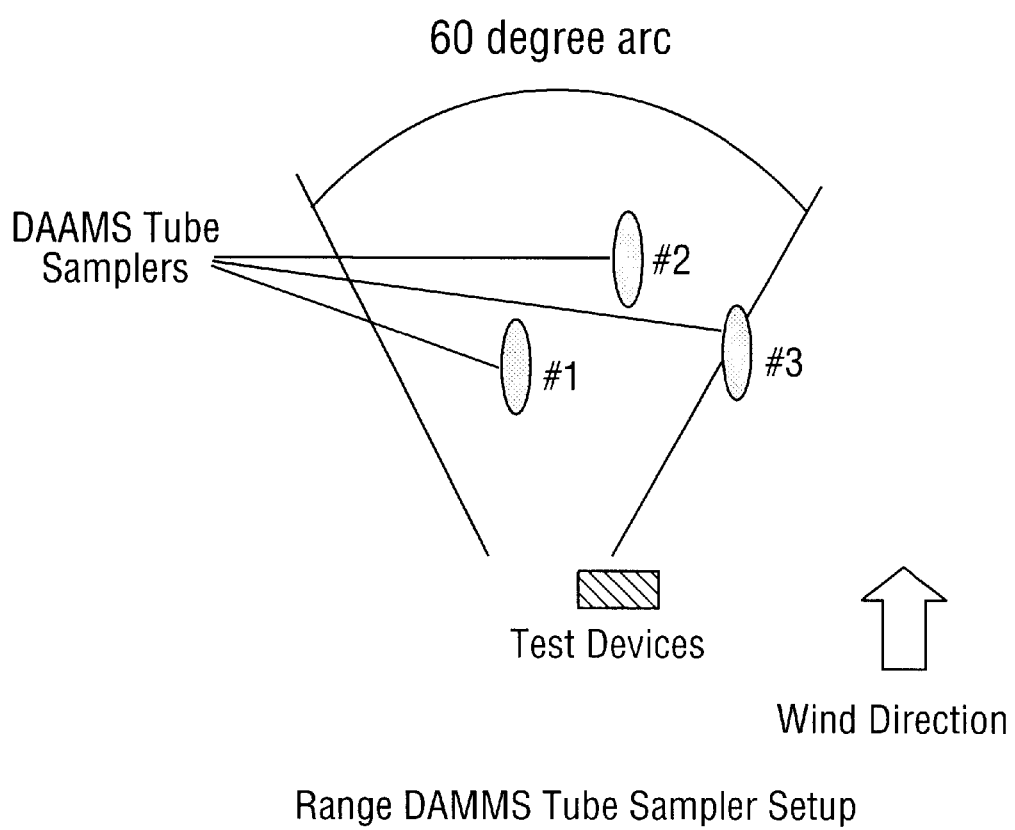
Figure 14:
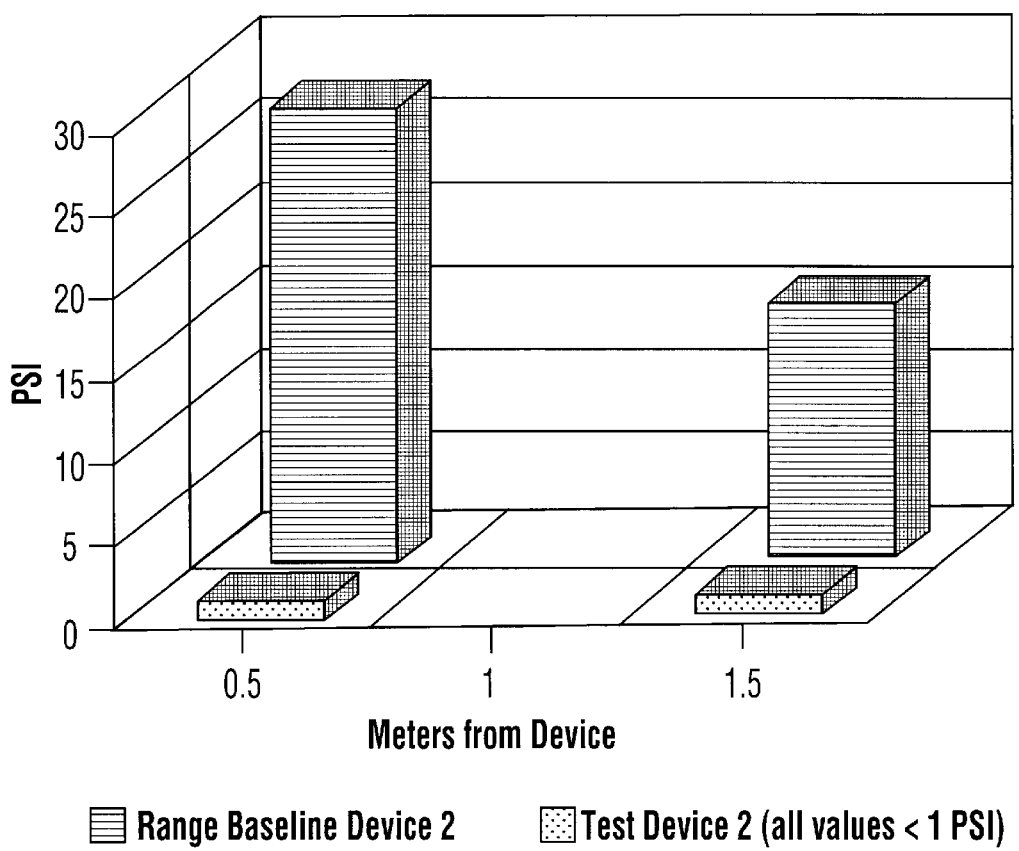
Figure 15:
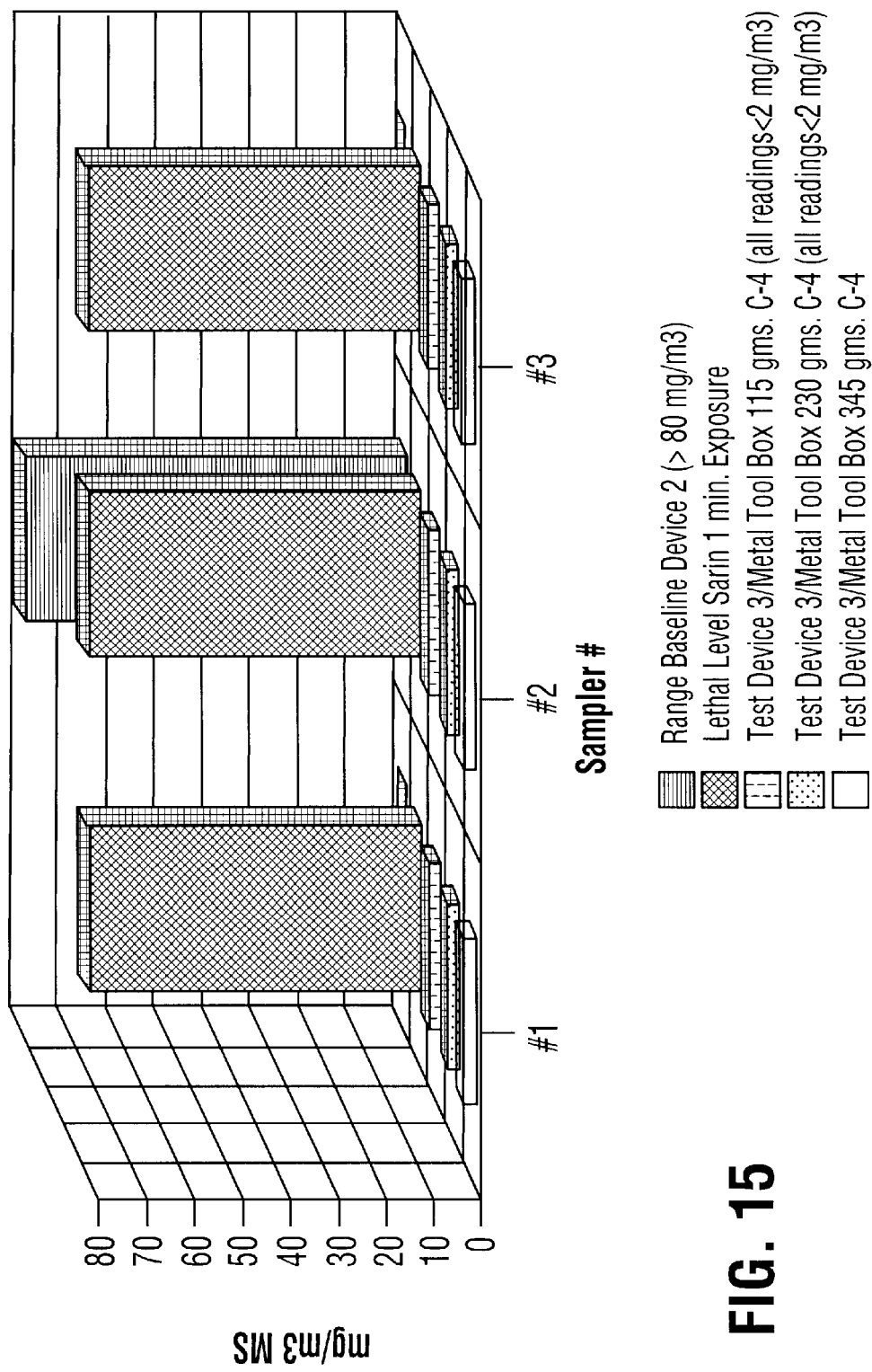
Figure 16:
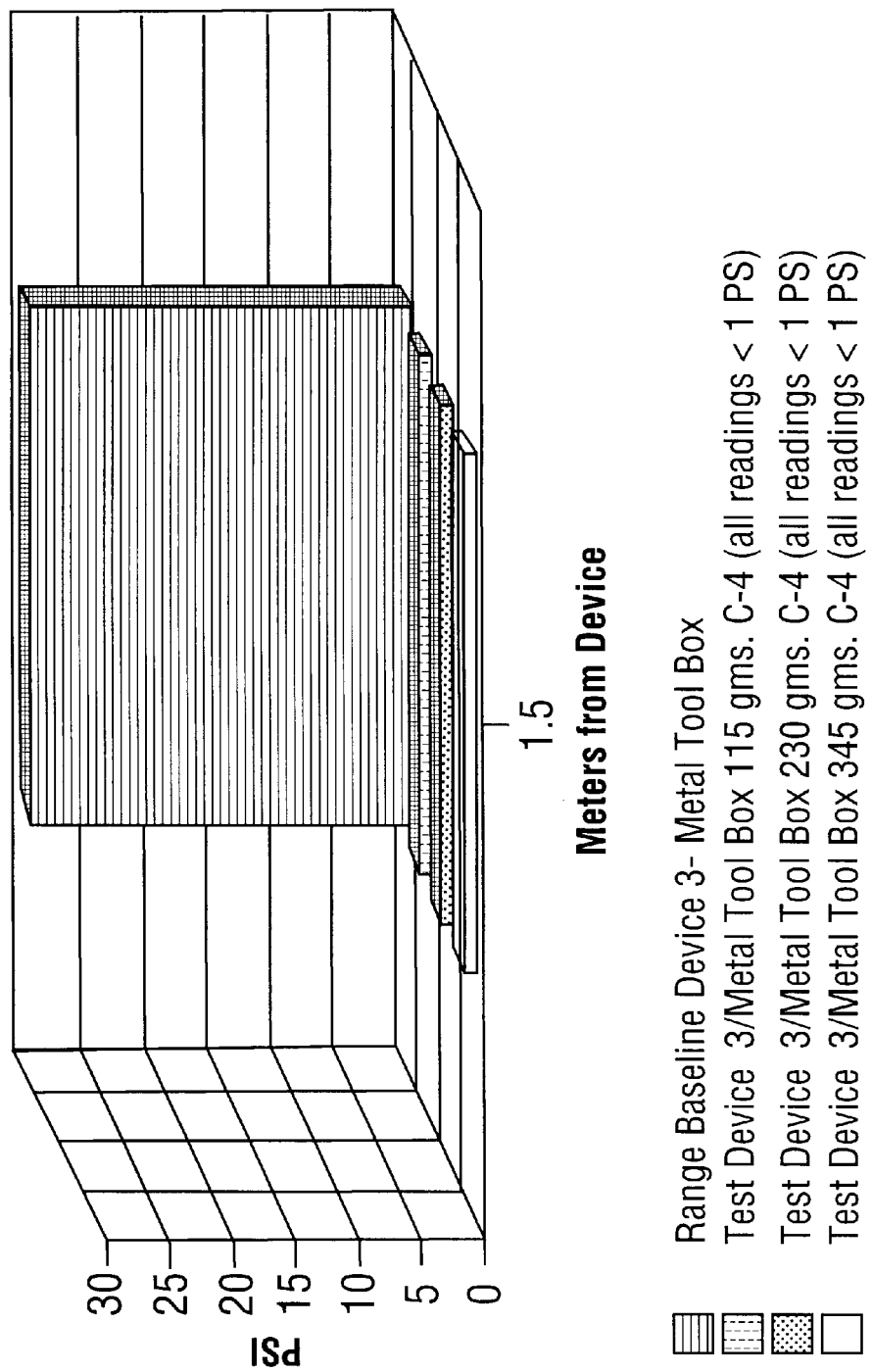

FIG. 8 illustrates the comparison between unmitigated Baseline shots and Test shots. Simulant formed a fine aerosol that behaved like that of biological agent. The percentage of agent captured was in the order of 95%;

FIG. 9 shows the over pressure readings collected by a pressure transducer placed at 1.5 meters. The Baseline shots were between 6 and 7 Pounds per Square Inch (PSI). The Test shot readings were almost negligible. The enclosure did not tear, all contents remained in the tent;

FIG. 10 depicts the concentrations of simulant in the tests chamber after an unmitigated baseline shot and a contained shot. As well, the lethal level of Sarin for a one minute exposure is displayed. A high level of simulant capture is noted;

FIG. 11 illustrates the over pressure measurements at the noted distances from the device for both an unmitigated and a contained shot. The findings indicated over pressure containment in the order of 90%;

FIG. 12 represents the air concentrations of simulant as measured by DAAMS Tube Samplers in an outdoor trial as noted in FIG. 13. This simulated a device being initiated outside of a structure. The data recorded during the Test Device shot indicated containment greater than 95%;

FIG. 13 illustrates the Range DAAMS Tube Sampler Setup;

FIG. 14 illustrates the over pressures recorded on two tests, an unmitigated test and a contained test. The readings recorded on the contained shot were barely measurable <1PSI;

FIG. 15 depicts one baseline unmitigated shot, and three contained test shots with different explosive amounts as noted. Samplers set as noted in FIG. 13. Containment realized in excess of 95%; and FIG. 16 shows the over pressure values measured at 1.5 meters from the test device unmitigated and three contained shots, each with different explosive loads as noted. Over pressure values were diminished by greater than 95%.

DETAILED DESCRIPTION OF THE INVENTION

The blast suppressant composition according to the invention includes:

A. Foaming agents/surfactants

B. Foam stabilizers; and

C. Coupling agents/solvents

A. Foaming Agents/Surfactants

The requisite properties include:

1) They all provide good quality foams over a wide range of pH;

2) They are compatible with other surfactants and mixtures thereof;

3) They tolerate hard fresh water and seawater, and

4) They are good emulsifiers.

Examples

1) Alkyl sulfates;

2) Alkyl ether sulfates;

3) Alkyl polyglycosides;

4) α-olefin sulfonates; and

5) Alkyl sulfosuccinates.

B. Stabilizers

It is known that long chain fatty alcohols generally impart high stability to foam.

C. Coupling Agents/Solvents

Coupling agents solubilize the surfactants, couple them with the stabilizers, and act as foam boosters and stabilizers. In prior art foams, the coupling agents are glycol ethers.

In the present invention, they have been replaced with a co-solvent, as discussed hereinafter.

A. Foaming Agents

The percentage dilution requirement of each surfactant for optimal foamability was established by plotting volume of foam produced against percentage concentration. The five surfactant types listed earlier were studied and the following results were obtained (FIG. 1.).

From these results, it was established that the different classes of surfactants exhibit a similar pattern of foamability under a very narrow range of concentration.

The alkyl ether sulfates group, specifically the C12–C14 alkyl ether suites and the shorter chain C8–C10 analogs were found to perform well in both mesh and seawater.

The preferred alkyl ether sulfates are of two types (1) $R_n H_{2n+1}(OCH_2CH_2)_m SO_4^- M^+$, where $R=C_8$–$C_{18}$, but mainly $C_{12}$ and $C_{14}$; n=0–10; m=2–3, but averages 2.3; and $M=Na^+$ or $NH_4^+$, and (2) being of the same formula as (1), but where $R=C_8$–$C_{10}$, only.

It was also interesting to discover that a 50:50 blend of the C8–C10 alkyl ether sulfates and C12–C14 alkyl ether sulfates showed no drop in foamability in seawater. It is conceivable that the micelles of the shorter chain length surfactants solubilize longer chain length analogs. Furthermore, it was found that the use of dual components improved the seawater compatibility. Here again, this phenomenon can be attributed to the solubility of mixed micelles.

It was interesting to note that the mixed surfactants system exhibits good stability of the dilute solution with time (FIG. 2.). It is known that foamability of a single surfactant system displays typical foamability drops with time as shown by the results in FIG. 2. This is due to the attainment of equilibrium with time. It would appear that the use of dual surfactant system speeds up attainment of this equilibrium.

B. Stabilizers

Long-chain, often water insoluble, polar compounds with straight chain hydrocarbon groups of approximately the same length as the hydrophobic group of the surfactant, e.g. long chain fatty alcohols;

The fatty alcohol commonly known as "lauryl alcohol" (C12–C14 linear alcohol 70:30) provided the best stabilizer for the group of surfactants under study. It was found that maximal foam stability could be achieved with a concentration of lauryl alcohol equivalent to about 15±2% of weight of surfactant (on an active basis). Use of lauryl alcohol above these levels resulted in a significant drop in foam expansion (FIG. 3.).

C. Effect of Coupling Agents/Solvents

Generally it can be stated that, at any particular concentration of surfactant, not only does the foamability increase with amount of coupling agent, the stability of the foam increases as well, as is shown in FIGS. 4 and 5.

Selection of Ingredients

A. Foaming Agents

After the preliminary study, it was decided to narrow down the ingredients further to the following specific surfactants:

1) Alkyl ether sulfates C8–C10: Cedepal® FA-406 and C12–C14: Cedepal® TD407 from the Stepan Co.

2) α-olefin sulfonates: Bio-Terge® AS-90 and Stepantan® AS-12, again from the Stepan Co.

3) Dialkyl sodium sulfosuccinate: Aerosol®-OT,

B. Stabilizers

1) Dodecanol: Lorol® 70:30 which is a blend of C12–C14 aliphatic alcohols in the ratio of 70:30

C. Solvents

1) Glycol Ethers.

In order to improve the performance of the formulation, it was decided to replace the solvent in the formulation with a co-solvent. The term co-solvent is used herein to define organic-based chemicals that solubilize CB agents e.g. from alkalyd-coated (painted) surfaces.

The co-solvent was incorporated into a few formulations and the resulting foaming characteristics were evaluated. Generally, it can be said that the co-solvent did not depress the foaming characteristics (foam expansion and drainage) significantly so it was decided to use it as a solvent instead of looking for a substitute for the glycol ethers and having to repeat the screening process.

Five formulations were prepared as shown in Table 1.

TABLE 1

Percentage Composition of Components in New Candidate Foam Formulations.

| Ingredients | #1 | #2 | #3 | #4 | #5 |
|---|---|---|---|---|---|
| Alkyl Ether Sulfate (FA-406) | 30 | NIL | NIL | NIL | 30 |
| Alkyl Ether Sulfate (TD-407) | 26 | 26 | 26 | 26 | NIL |
| α-olefin Sulfonate (AS-90) | NIL | 15.5 | NIL | NIL | 15.5 |
| α-olefin Sulfonate (Stepantan AS 12) | NIL | NIL | 15.5 | NIL | NIL |
| Sulfosuccinate (Aerosol OT) | NIL | NIL | NIL | 50 | NTL |
| Lauryl Alcohol | 5.0 | 5.0 | 5.0 | 5.0 | 5.0 |
| Co-Solvent | 20.0 | 20.0 | 20.0 | 20.0 | 20.0 |
| Citric Acid to pH 7.5 | | | | | |
| Water QS to 100% | | | | | |

These candidate formulations satisfied all the requirements mentioned earlier, viz. The co-solvent is a polyalkylene glycol e.g. polypropyleneglycol monomethyl ether (PPG 425).

1) They all exhibited good foaming characteristics over a wide range of pH (from 6–9) in both fresh and seawater. Citric acid is used to adjust the pH.

2) The dilute solution and the concentrate are stable over a period of time.

Bio-Terge AS-90, which is a sodium salt of C14–C16 α-olefin sulfonate, can replace Stepantan AS-12, which is also a C14C16 α-olefin sulfonate at the same concentration. Secondly, FA406, which is an ammonium alkyl (C8–C10) ether sulfate, could replace TD-407, which is a sodium alkyl (C12–C14) ether sulfate, at a slightly higher concentration (i.e. 30.0% w/v). Also, Steol CS-460, which is a sodium salt of a linear fatty alcohol ether sulfate, could replace TD-407, also at 30%/w/w.

Accordingly, the three formulations shown in Table 2 where selected for further study.

TABLE 2

| Ingredients | GCE I | GCE II | GCE III |
|---|---|---|---|
| $H_2O$ | 33.3 | 38.9 | 36.7 |
| An alkyl ether sulfate of formula $R_nH_{2n+1}$—$(OCH2CH2)_m$—$SO_4^-M^+$; where $R = C_8$—$C_{18}$ but mainly $C_{12}$ and $C_{14}$; m is 2–3 but averaging 2.3; and M is $Na^+$ or $NH_4^+$ | 18.5 | 18.5 | 20 |
| n-alkyl ether sulfate of formula $R_nH_{2n+1}$—$(OCH2CH2)_m$—$SO_4^-M^+$; where $R = C_8$—$C_{10}$ only; m is 2–3 but averaging 2.3; and M is $Na^+$ or $NH_4^+$ | 10 | 0 | 0 |
| ROH where R is $C_{12}$—$C_{14}$ | 5 | 5 | 5 |

TABLE 2-continued

| Ingredients | GCE I | GCE II | GCE III |
|---|---|---|---|
| PPG 425 (Polypropylene Glycol (monomethyl ether) Ave. M.W. 425 Daltons) | 20 | 20 | 20 |
| Sulfosuccinate: Na—$O_3S$—$CH_2$(COOR)—$CH_2COOR$ where R is $C_{12}$—$C_{14}$ | 0 | 15 | 0 |
| α-olefin Sulfonate; Stepantan ™ AS-12 | 0 | 0 | 15.5 |

It is expected that related PPGs of slightly different molecular weights would be equally as effective.

The preferred formulation (GCE-3) is as given in Table 3.

TABLE 3

| INGREDIENTS | % W/V |
|---|---|
| Alkyl Ether Sulfate (Steol CS-460) | 30.0 |
| α-Olefin Sulfonate (Bio-Terge AS-90) | 15.5 |
| Lauryl Alcohol (Blend of C12–C14 70:30) | 5.0 |
| Polypropyleneglycol monomethyl ether (PPG 425) | 20.0 |
| Citric acid to pH 7.5 | |
| Water QS To 100% | |

Long Term Stability

A. Concentrate

The optimized concentrate using GCE3 was aged in an oven at 65° C. for 30 days and examined thereafter, there was no sign of stratification or phase separation. The material was diluted at one per cent and the foam characteristics were unchanged.

B. Diluted Solution

A 1% dilute solution of the optimized concentrate using GCE-3 wax aged for 24 hours and its foaming properties examined. There was no decrease in foaming characteristics for over a period of about four hours after which there was a slight decrease (less than 5%) in foam characteristics followed by stabilization overnight.

Foam properties (expansion and drainage rate) were characterized using modified formulation GCE-3 at one percent (1%) dilution in tap water.

Corrosion

It is known that surfactant mixtures, especially in a diluted state, are corrosive to certain metals and alloys.

A detailed corrosion study can be very time consuming. For this purpose the protocol issued by the USDA Forest Service was used as guideline. The method for evaluating corrosion is described in the USDA protocol incorporated herein by reference. Coupons of metals or alloys are immersed in either the foam concentrate or its dilute solution and held at 65° C. for 30 days or longer. The liquid is then examined for discoloration and/or gel formation and the coupons are washed and cleaned and examined for pitting and/or surface damage and/or weight loss.

The metals or alloys examined were:

1. Mild Steel AISI 4130;
2. Yellow Brass;
3. Aluminum 2024-T3; and
4. Magnesium AZ-31-B.

Results

Both concentrate and dilute solution showed slight to excessive corrosion on all four metal strips.

The addition of the following ingredients to the GCE-3 concentrate completely eliminated the corrosivity of both the concentrate and the dilute solutions on mild steel, copper alloy and aluminum but magnesium was still attacked.

1) For protection of copper, brass, bronze and, to a limited extent, steel, cast iron, cadmium and zinc, sodium tolyltriazole was added at a concentration of 0.05% w/v.
2) For protection of mild steel and cast iron, ammonium dimolybdate was incorporated at 0.2% w/v together with sodium pentahydrate silicate at 0.05% w/v.

Therefore, these three ingredients are recommended for incorporation into the final formulation.

The recommended formulation will consist of the ingredients listed in Table 4.

TABLE 4

| INGREDIENTS | % W/V |
| --- | --- |
| Alkyl Ether Sulfate $Na_4^+$ Salt (eg. Steol CS-460) | 30.0 |
| α-Olefin Sulfonate Na Salt (eg. Bio-Terge AS-90) | 15.5 |
| Docecanol, (Lauryl Alcohol) (eg. Lorol C70/30%) | 5.0 |
| Polypropylene glycol monomethyl ether (PPG 425) | 20.0 |
| Sodium Tolyltriazole | 0.05 |
| Ammonium Dimolybdate | 0.20 |
| Sodium Pentahydrate Silicate | 0.05 |
| Citric Acid to pH 7.5 | |
| Water QS to 100% | |

Experimental

Two test series(1 and 2) were conducted in 1994–96 to determine the mitigation capacities of this foam system to contain CB agents. The first series of tests(series 1, below) in 1994 were done with non-fragmenting explosive dissemination models designed to project CB simulants. The second series(series 2, below) in 1996 examined the performance of the system when challenged by non-explosive dispersal models as well as high energy devices. The high energy explosive dispersal models gave us an indication of the upper device limits that we could contain.

During this development stage we began to reinforce the nylon tent(used in test series 1, below) by adding a layer of ballistic material over the foamed enclosure. Two ballistic materials were tested; DYNEEMA and KEVLAR. Each fabric was tested by itself and in combinations with one and other. We chose Dyneema as the fabric to be used in the containment structure because it demonstrated superior qualities in capturing high velocity bomb fragments. This dome tent shaped design has evolved to a base unit being fabricated from 3 layers of DYNEEMA and an outer an inner layer of rip stop nylon. There are two containment structure sizes, one approximately 2.75 meters diameter and the second approximately 2 meters(used in test series 2, below). This contaminant system is the subject of our co-pending U.S. application serial. No. 60/069,533, filed Dec. 12, 1997.

Test Series 1

This test series was conducted in the fall of 1994 at the Edgewood, Research, Development and Engineering Center, US Base Aberdeen Proving Ground, Edgewood, Md.

Chemical Agent Device Model (See FIGS. 6 and 7, below)

This was a simple device that included a 1 liter high density polyethylene laboratory bottle and a center burster of approximately 125 grams of C-4 explosive, initiated by an electric blasting cap. The bottle was filled with approximately 950 milliliters of methyl salicylate, a chemical agent simulant for mustard agent.

Biological Agent Device Model (See FIGS. 8 and 9, below)

The same design was used for this model except that the methyl salicylate was replaced by a biological agent simulant, calcium hydroxide.

Test Facility Description

This test series was conducted in a cylindrical shaped blast test chamber that is 32 feet in diameter and 20 feet high.

Dispersal Suppressant Foam Containment Units

Four person nylon tent—2 meter diameter dome shape, filled with Dispersal Suppressant Foam(DSF). The DSF is SILVEX foam concentrate diluted to 1.7%/w in water. It will be appreciated by those skilled in the art that these results can be extrapolated to other foam formulations according to the invention i.e. the DSF formulations described above, based on the evaluation of various physical properties of the foam produced with these formulations as compared to SILVEX foams, and a blast test with one of these formulations (GCE3) against an actual improvised chemical dispersant device containing weapons grade material, in which we observed similar blast mitigation properties. Confirmatory tests are underway.

Diagnostic Equipment/Methodology

| | |
|---|---|
| Chemical Concentration | Miniature Infra-red Gas Analyzer (MIRAN) ™ |
| Biological Concentration | Airborne Aerosol Mass Concentration Determination[1] |
| Blast Overpressures | ENDEVCO ™ Piezoresistive Pressure Transducer and Anderson Blast Gauges |

[1]This value is determined by collecting simulant on a filter pad within a Gillian Personnel Sampler pump, then given known flow rates and chamber volume, extrapolating the Airborne Aerosol Mass concentration.

Test Series II-1996

This test series was conducted in the fall of 1996 at the Edgewood Research, Development and Engineering Center, US Base Aberdeen Proving Ground, Edgewood, Md.

Device Model

In Series I the model device made use of a simple non-fragmenting explosive dissemination method. In this test series we have examined the effects of functioning more energetic fragmenting devices to disperse agent as well a selection of less energetic dispersal systems i.e. high pressure aerosol formation.

The agent simulant selected was Methyl Salicylate (MS). We did not conduct any tests with bio simulant as we felt the chemical provided a worst case scenario to challenge our mitigation systems, and a bio shot would simply be an unecessary duplication.

The devices used are as follows:

Device 1—100 grams C-4 central burster in 1 liter plastic lab bottle, w/approximately 950 mls. of MS Device 2—120 grams dispersal charge on bottom of 1 liter lab bottle, w/1 liter of MS Device 3MX—steel tool box w/batteries, timer, circuit, 500 mls. MS simulant —X denotes grams of C-4 i.e. 115, 230, 345 grams.

Device 4—commercial garden sprayer w/1 liter MS

Test Facility Description

This test series was conducted on a range and in a test chamber (20'×30'×10'/169 m3) at US Base Aberdeen Proving Ground.

30 Dispersal Suppressant Foam Containment Units

Dome shaped enclosure structure filled with DSF foam (approx. 570 cubic ft.)made of a five layer textile composite. The outside and inside layers are of a light rip stop nylon and the three inner layers are of a ballistic material called DYNEEMA. The DSF is the same as in test series 1.

Diagnostic Equipment/Methodology

| | |
|---|---|
| Chemical Concentration - Chamber | Miniature Infra-red Gas Analyzer (MIRAN) |
| Chemical Concentration - Range (three samplers per shot placed as noted below) | Simulant aerosols collected on Depot Area Air Monitoring System (DAAMS) tubes then thermally desorbed into HP 5890 GC/FD. |
| Blast Overpressures | ENDEVCO Piezoresistive Pressure Transducer and Anderson Blast Gauges |

A series of trials were held at DRES 25–27 May 1999 with the purpose of verifying the readiness and capability of the "final" version of the DSF Formulation as described in Table 4 above, including a CB decontaminant.

DSF Trial-Simulant

A 250 ml Nalgene bottle filled with DEM (diethylmalonate) was placed on the floor of a steel containment tray which was inside a wood frame enclosure sealed with polyethylene vapour barrier material. The bottle was equipped with a 18 cm length of 150 grain Det Cord and a No. 12 electronic detonator. The enclosure had dimensions 12 ft×12 ft by 10 ft height. Located within the enclosure on a bench was a MIRAN Analyser and two Chemical Agent Monitors (CAMs) and other components of a Chemical Agent Detection System (CADS) station Co-located outside and around the enclosure at a distance of approximately 5 m were four CADS Stations and four MRIAN Analysers. The MTRANs were set as follows:

| | |
|---|---|
| Wavelength: | −8.65 micrometers (DEM) |
| Pathlength: | −20.25 m |
| Slit width: | −1 mm |
| Absorbance scale range: | −0.1 A |

The CADS Station CAMs were set for G-mode as DEM produces responses in this mode.

Two RCMP personnel then placed the smaller of two available Blast Guard ballistic tents described in our co-pending U.S. application Ser. No. 09/308,836 now U.S. Pat. No. 6,173,908 over the bottle and then filled the tent with pre-mixed CB-decontaminating blast suppressant foam delivered by the Irvin Aerospace pumping system. The operating parameters of the foam delivery are an expansion ratio of 20–25, and a flow rate at the air aspirated nozzle of 60 US gallons/minute. The nozzle is the subject of our co-pending U.S. application Serial No. 60/069,533. After the tent was filled and personnel had moved off the layout, the bottle was detonated remotely using a ZEB Exploder. The tent contained all material and sustained no blast damage. Very little sound was produced by this detonation inside the tent.

After an inspection of the layout and tent to verify that the explosive, had been properly functioned, the tent head space and containment shelter air were examined using portable CAMs and the Hapsite GC/MS Analyser. These air samples were acquired at 10 minutes after detonation of the DEM-filled bottle. The temperature of the head space was measured with a portable infrared temperature "gun" Further surveys with CAMs were conducted at the 30 minute mark.

The tent was opened and the contents were allowed to drain into the containment tray. Further CAM air surveys were conducted close to the fluid to determine the presence of residual DEM.

DSF Trial—Agent

The same trial set-up as used for the DEM simulant tial (see above) was used for the trial involving mustard agent, except for the following changes:

the 250 ml Nalgene bottle filled with mustard was secured to a ringstand approximately 0.3 m above the floor of the containment tray instead of being placed on the floor of the tray;

the larger of the two Blast Guard ballistic tents was used to cover the bottle;

a the CAMs were set to operate in the H-mode.

the analytical wavelength of each MIRAN was set to 12;.25 micrometres. This was subsequently discovered to be incorrect for monitoring mustard agent vapour (see Results and Discussion);

all participants in this trial wore full Individual Protective Equipment (IPE) consisting of the Canadian Forces NBC Protective Ensemble, C4 Respirator and NBC Gloves and Overboots.

Two RCMP personnel filled the tent with premixed CB-decontaminating blast suppressant foam delivered by the Irvin Aerospace pumping system. After personnel moved off the layout, the bottle was detonated remotely using the ZEB Exploder. The tent contained all material and sustained no blast damage. Very little sound was produced by this event.

After an inspection of the layout and tent to verify that the explosive had been properly functioned, the tent head space and containment shelter air were examined using portable CAMs and the Hapsite GC/MS Analyser at 10 minutes following the functioning of the dispersal device. The head space air temperature was measured with the portable infrared temperature gun. A second survey using CAMS was carried out at the 30 minute mark. The tent contents were allowed to stand for one our before the tent was opened and the contents allowed to discharge into the containment tray. The air above the residual fluid was again surveyed using CAMs.

Results

DSF Trial-Simulant

The small tent used in this trial took less than 5 minutes to completely fill using the Irvin Aerospace pumping system. The foam-filled tent was able to, completely contain the bottle fragments and dispersed DEM with no visible signs of damage or leakage. Very little movement of the tent was observed on high speed video recordings of the tent at the moment the dispersal device was functioned.

DSF Trial-Agent

The larger tent used in this trial took approximately 5 minutes to completely fill using the Irvin Aerospace pumping system. Personnel experienced no difficulty in placing the tent over the dispersal device mounted on the ring stand. The foam-filled tent was able to completely contain the bottle fragments and dispersed mustard with no visible signs of damage or leakage. Very little movement of the tent was observed on high speed video recordings of the tent at the moment the dispersal device was functioned.

It will be appreciated that the presence of the CB decontaminant in the formulation does not adversely affect the blast suppressant performance.

We have now found that the formulation forms a soft gel, which liquifies upon stirring or pumping, at about 0° C. No one ingredient is responsible. We have modified the formulation, accordingly. First we modified the formulation by halving the amounts of the surfactants, and increasing the amount of the co-solvent. Although no substantive difference was found using amounts of PPG from 20–4% w/w, we fixed it at 25.00%w/w.

We then compared the use of C12 aliphatic alcohol as stabilizer to the C12–C14 aliphatic alcohol currently being used with an increase in the amount of the co-solvent to 25.00%w/w, at various concentrations of the alcohol. We concluded that the gelling is caused by the aliphatic alcohols and is a function of its concentration. Both the original C12–C14 alcohol and the C12 alcohol performed well at concentration of 0–1% w/w. This minor change in formulation brings a significant drop in the gelling point and the nature of the gel that the product can be used at temperatures around the 0° C.

The foaming characteristics based upon the same foam delivery parameters ie. Expansion ratio of 20–25 and flow rate of the nozzle of 60 US gallons/minute, are not altered by this modification. The aged dilute solution does not show any change in foaming characteristics. The concentrate performs equally well in sea as in fresh water.

It can be expected that the aliphatic alcohol C10 will perform equally well.

The composition shown in Table 5 has a slight advantage on the sane formulation with 0% w/w of alcohol as far as gelling is concerned.

TABLE 5

| INGREDIENTS | % W/W |
| --- | --- |
| Bioterge AS 90 | 7.75% |
| Steol CS 460 | 15.00% |
| PPG-425 | 25.00% |
| Aliphatic Alcohol Cl2: 97% | 1.0% |
| (+ corrosion inhibitors, as described above) | 0.3% |
| Water | qs to 100% |

What is claimed is:

1. A foam-forming composition comprising,
   (a) a surfactant . . . 40–80%/w/w
   (b) a foam stabilizer . . . 0–7%/w/w
   (c) a polyalkyleneglycol . . . 10–30%/w/w
   (d) water . . . balance to 100%
wherein the polyalkyleneglycol has the formula $R_1$—(OCH(CH$_3$)CH$_2$)$_n$—OR$_2$, where $R_1$ and $R_2$ are independently H, an alkyl, or an esther group and n>1, wherein the alkyl group may be methyl, ethyl, propyl, butyl group or a mixture thereof; or is a partially etherified derivative of the same formula $R_1$—(OCH(CH$_3$)CH$_2$)$_n$—OR$_2$, wherein one of $R_1$ or $R_2$ is independently H, or an alkyl group and n>1 and the alkyl group representing $R_1$ or $R_2$ may be a methyl, ethyl, propyl, butyl group or a mixture thereof.

2. A composition according to claim 1, comprising
   (a) a surfactant . . . 41.5–76%/w/w
   (b) a foam stabilizer . . . 3–7%/w/w
   (c) a polyalkyleneglycol . . . 10–30%/w/w
   (d) water . . . balance to 100%.

3. A composition according to claim 1, comprising
   (a) a surfactant . . . 18.5–28.5%/w/w
   (b) a foam stabilizer . . . 3–5%/w/w
   (c) a polyalkyleneglycol . . . 10–30%/w/w
   (d) water . . . balance to 100%.

4. A composition according to claim 1, additionally comprising a corrosion inhibitor.

5. A composition according to claim 1, comprising
   (a) an alkyl ether sulfate . . . 22.75%/w/w
   (b) a C12(97%) aliphatic alcohol . . . 1%/w/w
   (c) a polypropylene glycol monomethylether 25.0%/w/w
   (e) a corrosion inhibitor . . . 0.3%/w/w
   (e) water . . . balance to 100%.

6. A composition according to claim 1, comprising
   (a) a surfactant . . . 22.75%/w/w
   (b) a foam stabilizer . . . 0–1%/w/w
   (c) a polyalkyleneglycol . . . 20–30%/w/w
   (d) water . . . balance to 100%.

7. A composition according to claim 6, comprising 20%/w/w of a polyalkyleneglycol.

8. A composition according to claim 1, wherein the surfactant comprises a composition of either the formula $[R(OCH2CH_2)nX]_aM_b$, were R is an alkyl group having from eight to eighteen carbon atoms; n is an integer from 1 to 10; X is selected from the group consisting of $SO_3^{2-}$, $SO_4^{2-}$ and $PO_4^{3-}$; M is an alkali metal, alkaline earth metal, ammonium or amine derivative; a is the valence of M and b is the valence of $[R(OCH_2CH_2)_nX]$, or the formula $[R—CH=CH(CH_2)_m—X]_aM_b$, where R is an alkyl group having from eight to eighteen carbon atoms; m is an integer from 0 to 3; X is selected from the group consisting of $SO_3^{2-}$, $SO_4^{2-}$ and $PO_4^{3-}$; M is an alkali metal, alkaline earth metal, ammonium or amine derivative; a is the valence of M and b is the valence of $[R—CH=CH(CH_2)_m—X]$, or a mixture thereof.

9. A composition according to claim 8, wherein the surfactant is of the formula $[R(OCH_2CH_2)_nX]_aM_b$, where R is an alkyl group having from eight to eighteen carbon atoms; n is an integer from 0 to 10; X is selected from the group consisting of $SO_3^{2-}$, $SO_4^{2-}$, $CO_3^{2-}$ and $PO_4^{3-}$; M is an alkali metal, alkaline earth metal, ammonium or amine derivative; a is the valence of M and b is the valence of $[R(OCH_2CH_2)_nX]$, or mixtures thereof.

10. A composition according to claim 8, wherein the surfactant is of the formula $[R—CH=CH(CH_2)_m—X]_aM_b$ where R is an alkyl group having from eight to eighteen carbon atoms; m is an integer from 0 to 3; X is selected from the group consisting of $SO_3^{2-}$, $SO_4^{2-}$, $CO_3^{2-}$ and $PO_4^{3-}$; M is an alkali metal, alkaline earth metal, ammonium or amine derivative; a is the valence of M and b is the valence of $[R—CH=CH(CH_2)_m—X]$, or mixtures thereof.

11. A composition according to claim 8, wherein the polyalkyleneglycol is a polypropyleneglycol monomethylether.

12. A composition according to claim 11, wherein the polypropyleneglycol monomethylether has a molecular weight of 425.

13. A composition according to claim 1, wherein the surfactant is selected from the group consisting of alkyl ether sulfates, alpha-olefin sulfonates and alkyl sulfosuccinates.

14. A composition according to claim 13, wherein the surfactant is an alkyl ether sulfate.

15. A composition according to claim 14, wherein the polyalkylene glycol is a partially etherified polypropylene glycol.

16. A composition according to claim 15, herein said partially etherified polypropylene glycol has the formula $R(OCH_2CH_2CH_2)_n$—OR$_2$, where one of $R_1$ or $R_2$ is independently H, or an alkyl group and n>1.

17. A composition according to claim 14, wherein the foam stabilizer is a long chain fatty alcohol.

18. A composition according to claim 17, wherein the long chain fatty alcohol is C12(97%) alcohol.

19. A method for suppression and containment of blast from explosive devices, comprising applying to the explosive device a foam produced from a foam-forming composition according to claim 1.

* * * * *